(12) United States Patent
Eitzinger et al.

(10) Patent No.: US 9,447,861 B2
(45) Date of Patent: *Sep. 20, 2016

(54) COMPONENT WITH AN ADAPTIVE COATING

(75) Inventors: Guenter Eitzinger, Timelkam (AT); Thomas Gasperlmair, Oberweis (AT); Klaus Preinfalk, Niederneukirchen (AT); Katrin Zorn, Pettenbach (AT)

(73) Assignee: High Tech Coatings GmbH, Laakirchen (AT)

( * ) Notice: Subject to any disclaimer, the term of this patent is extended or adjusted under 35 U.S.C. 154(b) by 75 days.

This patent is subject to a terminal disclaimer.

(21) Appl. No.: 14/116,410

(22) PCT Filed: May 10, 2012

(86) PCT No.: PCT/AT2012/050066
§ 371 (c)(1),
(2), (4) Date: Dec. 19, 2013

(87) PCT Pub. No.: WO2012/151603
PCT Pub. Date: Nov. 15, 2012

(65) Prior Publication Data
US 2014/0109709 A1    Apr. 24, 2014

(30) Foreign Application Priority Data

May 11, 2011 (AT) .................................. A 663/2011

(51) Int. Cl.
*B32B 5/14* (2006.01)
*F16H 55/06* (2006.01)
*F16H 55/17* (2006.01)
*F16H 57/04* (2010.01)

(52) U.S. Cl.
CPC .............. *F16H 55/06* (2013.01); *F16H 55/17* (2013.01); *F16H 57/041* (2013.01); *Y10T 74/1987* (2015.01); *Y10T 74/19679* (2015.01)

(58) Field of Classification Search
None
See application file for complete search history.

(56) References Cited

U.S. PATENT DOCUMENTS

| 2,075,995 | A | * | 4/1937 | Morgan | 74/434 |
| 3,636,792 | A | * | 1/1972 | Vigh | 74/461 |
| 4,184,380 | A |   | 1/1980 | Rivin |  |
| 4,594,294 | A | * | 6/1986 | Eichen et al. | 428/552 |
| 4,612,256 | A | * | 9/1986 | Neuhauser et al. | 428/547 |
| 4,680,438 | A | * | 7/1987 | Witting et al. | 200/268 |
| 4,946,747 | A | * | 8/1990 | Bergmann et al. | 428/653 |
| 5,955,145 | A | * | 9/1999 | Kalvala et al. | 427/246 |

(Continued)

FOREIGN PATENT DOCUMENTS

| CN | 1678848 A | 10/2005 |
| CN | 101358365 A | 2/2009 |

(Continued)

OTHER PUBLICATIONS

International Search Report of PCT/AT2012/050066, mailed Sep. 24, 2012.

*Primary Examiner* — Humera Sheikh
*Assistant Examiner* — Seth Dumbris
(74) *Attorney, Agent, or Firm* — Collard & Roe, P.C.

(57) ABSTRACT

A component includes a component body which has a toothed section. An adaptive coating is applied, at least in parts, to the toothed section, the coating having a thickness of at least 5 μm. The adaptive coating may have a hardness gradient that has an increasing hardness from an outer coating surface in the direction towards the component body.

8 Claims, 4 Drawing Sheets

(56) References Cited

U.S. PATENT DOCUMENTS

Figure 1:
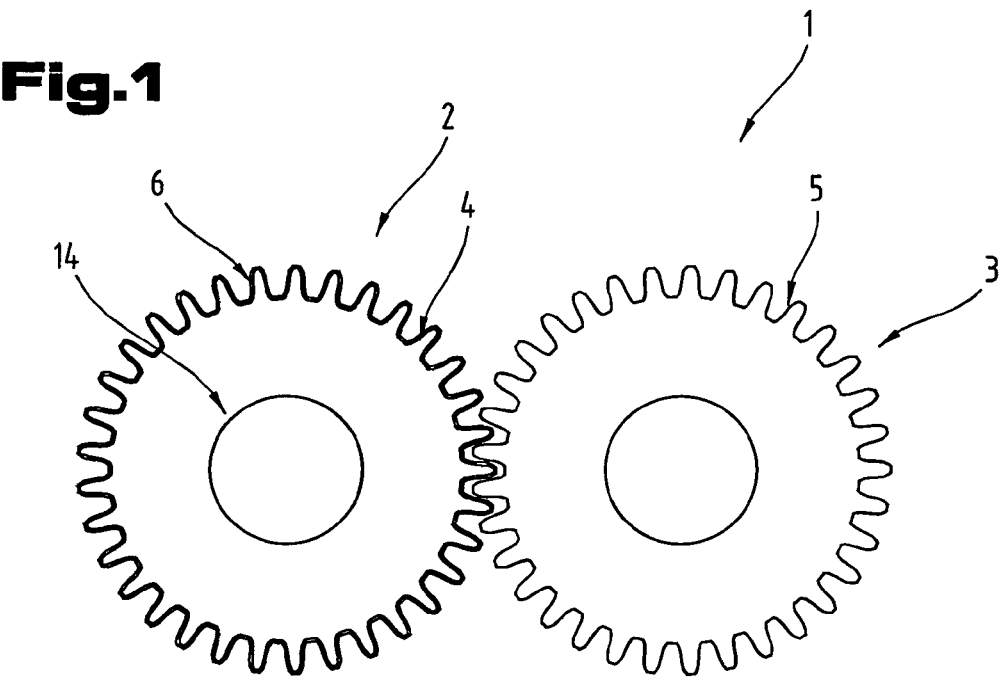

| | | | |
|---|---|---|---|
| 6,379,754 B1 * | 4/2002 | Schlegel et al. | 427/446 |
| 6,537,683 B1 * | 3/2003 | Staschko et al. | 428/610 |
| 7,211,338 B2 * | 5/2007 | Strangman | 428/698 |
| 7,556,864 B2 * | 7/2009 | Yamanishi et al. | 428/602 |
| 7,686,734 B2 | 3/2010 | Mordukhovich et al. | |
| 7,910,217 B2 * | 3/2011 | Rai et al. | 428/457 |
| 8,029,917 B2 * | 10/2011 | Spain et al. | 428/673 |
| 2005/0274215 A1 * | 12/2005 | Bishop et al. | 74/425 |
| 2008/0170960 A1 | 7/2008 | Kotthoff et al. | |
| 2008/0194377 A1 | 8/2008 | Mordukhovich et al. | |
| 2009/0155479 A1 * | 6/2009 | Xiao et al. | 427/451 |
| 2010/0040864 A1 * | 2/2010 | McGilvray | F16C 33/12 428/323 |

FOREIGN PATENT DOCUMENTS

| | | | |
|---|---|---|---|
| DE | 10 2005 027137 A1 | 12/2006 | |
| EP | 1 552 895 A1 | 7/2005 | |
| GB | 1 139 522 A | 1/1969 | |
| JP | 07214428 * | 8/1995 | B23P 15/14 |
| JP | H11-210866 A | 8/1999 | |
| JP | 2006-327516 A | 12/2006 | |
| WO | 2004/022273 A2 | 3/2004 | |

* cited by examiner

COMPONENT WITH AN ADAPTIVE COATING

CROSS REFERENCE TO RELATED APPLICATIONS

This application is the National Stage of PCT/AT2012/050066 filed on May 10, 2012, which claims priority under 35 U.S.C. §119 of Austrian Application No. A 663/2011 filed on May 11, 2011, the disclosure of which is incorporated by reference. The international application under PCT article 21(2) was not published in English.

The invention relates to a component comprising a component body which has a toothing, as well as an assembly comprising at least two components which have at least one toothing each, with the at least two toothings being in meshing engagement.

The quality of the toothing of gears is usually classified in twelve quality categories according to DIN 3963, with 1 being the finest and 12 the rawest toothing quality. The classification is effected after the manufacturing process, and the toothing having quality 1-6 is honed, that having quality 2-7 is grinded, that having quality 5-7 is scraped, that having a quality of 5-9 is hobbed, planed by generating or shaped by generating, that having quality 7-12 is profile milled or form-shaped and that having quality 8-12 is punched, pressed or sintered, and it is also possible for the processing methods to be carried out in a combined way. In other words: a high toothing quality of a toothed wheel can be achieved by laborious working, which causes higher production costs.

Prior art already describes coatings adjusting the tooth flank clearance of a meshing engagement. Those are usually configured to be polymer-based and are abraded after the running-in phase, as otherwise the desired tooth flank clearance is not produced in the thickness of the coating—or double coating, in the event that both meshing toothings are coated. Such coatings are therefore not suitable for improving the toothing quality.

It is the objective of the underlying invention to design a toothed wheel which has a low toothing quality in such a way that it is suitable for higher requirements.

This objective is on the one hand achieved by the above-mentioned component and on the other hand by the assembly, and an adaptive coating is at least applied to sections of the toothing of the component, which coating has a thickness of at least 5 µm, and at least one of the components of the assembly is embodied according to the invention.

Due to the configuration of the adaptive coating in the mentioned minimum layer thickness it is achieved that that by mainly plastic deforming the coating the contact ratio of the toothing, i.e. the portion of the contact area in a toothing of another toothing during the meshing engagement, is enlarged, with the result that the surface loading is reduced. During the deformation of the coating, by way of which material of the rough peaks is brought into the valleys between those peaks (usually, the irregularities of the surface below are copied when the coating is deposited), it is additionally possible that a hardening of the coating takes place, with the result that also the mechanical strength of the component, i.e. of the toothing of the component, can be increased. Due to this deformation it is additionally achieved that the roughness of the surface is partially leveled. It is using the invention thus possible that e.g. a toothing having quality 10 achieves quality 8 to 6 due to the coating, in particular as regards run-out error or normal module band. In other words: arranging the adaptive coating in the mentioned minimum layer thickness considerably improves the macrogeometry of the surface of the toothing. It is thus possible for the components themselves to be produced by way of a more cost-efficient method, and by depositing the adaptive coating on the toothing no additional expensive hard-fine machining are necessary in order to achieve a higher toothing quality. The adaptive coating has furthermore the advantage that it abrasively wears in only those sections of the toothing that are extremely stressed during operation, i.e. the "leveling effect" survives over a long operation period. Due to the higher quality of the toothing achieved by the adaptive coating an improved acoustic behavior of the assembly equipped with this component is additionally achieved. In the event of the toothings exhibiting different qualities, the minimum layer thickness of the adaptive coating is adapted to the respective quality, i.e. to the respectively existing surface roughnesses. Since also the surface roughness of the toothing is copied to the coating during coating process—it is preferred if the same layer thickness is produced at least at approximately each coated place—the later support layer, which is produced by deforming the adaptive coating, should extend above the highest roughness peak of the toothing.

The toothing of the adaptive coating can optionally be pre-calibrated, e.g. by rolling.

It is preferred if the layer thickness is selected from a range having a lower limit of 5 µm and an upper limit of 100 µm, in particular from a range having a lower limit of 12 µm and an upper limit of 30 µm.

It is preferred if a component having a higher quality of the toothing is used as a second component having a toothing that is in meshing engagement with the component according to the invention, as this toothing may operate as embossing toothing" for the adaptive coating, and thus the quality of the toothing of the entire assembly can be improved.

According to an embodiment it is provided that the adaptive coating has a hardness gradient exhibiting an increasing hardness from an outer coating surface in the direction of the component body. It is thereby achieved that the adaptive coating, which is in meshing engagement with another toothing of an additional component when the component is fitted, can be embodied to be relatively soft, so that the deformation, i.e. the flattening of the profile peaks of the roughness profile can be carried out quickly and a better adhesion of the coating at the component body is furthermore achieved due to the greater hardness at the edge surface towards the component body. It is additionally possible that thereby a higher strength of the coating in the layers situated below the coating surface is made available, with the result that their mechanical strength during operation can be improved. Due to the greater hardness at the edge surface facing the component body, a better fatigue strength is achieved.

For improving these characteristics it is preferred if the adaptive coating of the outer coating surface has a hardness, which is selected from a range having a lower limit of HV 40 and an upper limit of HV 500, in particular from a range having a lower limit of HV 200 and an upper limit of 300, or according to another preferred embodiment, the hardness of the second surface, lying opposite the coating surface and pointing in the direction towards the component body, is selected from a range having a lower limit of HV 500 and an upper limit of HV 2000, in particular from a range having a lower limit of HV 800 and an upper limit of HV 1200. (microhardness according to Martens, test force 10 mN, see below)

It is possible that the adaptive coating is made of several different sub-layers. Even if this is not the preferred embodiment of the invention—since it is preferred if the properties merge into one another in a continuous way from the outer coating surface in the direction towards the component body—this embodiment may help to simplify the production of the adaptive coating, since layers having different compositions can be deposited on the component body one after the other, with the result that the effort in terms of open-loop control and closed-loop control can be reduced during the coating process.

In the preferred embodiment, the adaptive coating is embodied to be at least partly metallic. As compared to polymer layers, a higher durability of the adaptive coating is thereby achieved. It is additionally possible to achieve a greater variability in terms of the composition of the coating, since only a few polymers are suitable for the provided use of the component. Due to the adaptive coating exhibiting an at least partly metallic design, it is easier to take into account the different loading cases of the component, so that the invention may be used in a broader field. It is furthermore advantageous that the adaptive coating thus has a better thermal conductivity, so that one can better omit undesired phase transformations in the coating, and thus, the coating exhibits the at least approximately original phase composition over a longer period of time, so that its behavior during operation stays at least approximately the same over a longer period of time.

Within the course of the tests carried out for the invention it has shown that adaptive coatings are particularly suitable if they are formed by a multi-element system, with at least one element being selected from a group including transition metals, transition metal nitrides, transition metal carbides, transition metal oxides, as well as mixtures thereof, and according to one embodiment, an additional element of the multi-element system is for this purpose selected from a group comprising or consisting of Sn, Mg, Al, In, Bi, Si, Ni, Ag, Cr and Fe. The adaptive coating particularly includes the elements Ag and Cr or CrN, with the Ag content decreasing from the outer coating surface in the direction towards the component body, or the elements Cu, CuSn and Cr, with the CuSn content decreasing from the outer coating surface in the direction towards the component body, or the elements Ag and Ti, with the Ag content decreasing from the outer coating surface in the direction toward the component body. Furthermore, adaptive coatings have turned out to be advantageous, which are made of a copper bronze or an aluminum bronze, which contain optionally at least one of the elements chromium nitride, Fe, Cr, Ni, Ag. With reference to the nitrides it should be stated that in accordance with one embodiment, those are only present in transition regions, the coating has otherwise only metallic elements. Advantageously, only systems which have in their solid state a miscibility gap or non-miscible systems are used. It is particularly advantageous if the elements or metals are used that have a grid which is cubic face centered, as those are particularly well suitable in terms of the plastic deformability.

According to another embodiment of the component it is provided that the adaptive coating is at least approximately or completely free from abrasive particles, i.e. free from particles that would cause an abrasion at the toothing of an additional component of the assembly which toothing is in meshing engagement with the toothing of the component. The quality increase is thus mainly achieved by deformation work carried out at the adaptive coating itself and not by a targeted material removal in the region of the meshing engagement, so that the additional component, i.e. the above-described component exhibiting the "embossing toothing" remains undamaged. By preventing material abrasion, the ingress of dirt into a lubricating oil provided for lubricating the toothing is reduced, so that this oil can be used for a longer time. Since the lubricating oil does not contain any impurities originating from such an abrasion, it is consequently possible for the outer coating surface to be designed to be harder, because no arrangements in terms of embedding these particles of dirt into soft matrix particles of the coating must be taken, with the result that the load capacity of the adaptive coating can be improved.

For improving the adhesion of the adaptive coating at the component body, it is possible to arrange a bonding layer between the adaptive coating and the component body.

A better oil absorption of the adaptive coating or a better capacity of the adaptive coating to keep oil and consequently a reduction of the abrasion is achieved if the adaptive coating is provided with a porosity, with the porosity being particularly between 0.1% and 15%, preferably between 5% and 10%. The pores in the adaptive layer preferably have a maximum diameter of 3 µm, in particular 0.3 µm.

It should be noted that the coating does not have pores in the traditional sense, but has open "channels" or regions at the grain boundaries of the coating. It is thus also achieved that liquids, such as lubricating oils, can be absorbed.

In a variant of embodiment, the porosity decreases from the outer coating surface in the direction towards the component body. In other words: A gradient of the porosity is embodied in the adaptive coating. It is one the one hand possible to achieve the above-described improved capacity to keep oil and on the other hand an improved adhesion of the adaptive coating at the component body can be achieved.

To provide a clearer understanding, the invention will be described in more detail below with reference to the appended drawings.

Figure 2:
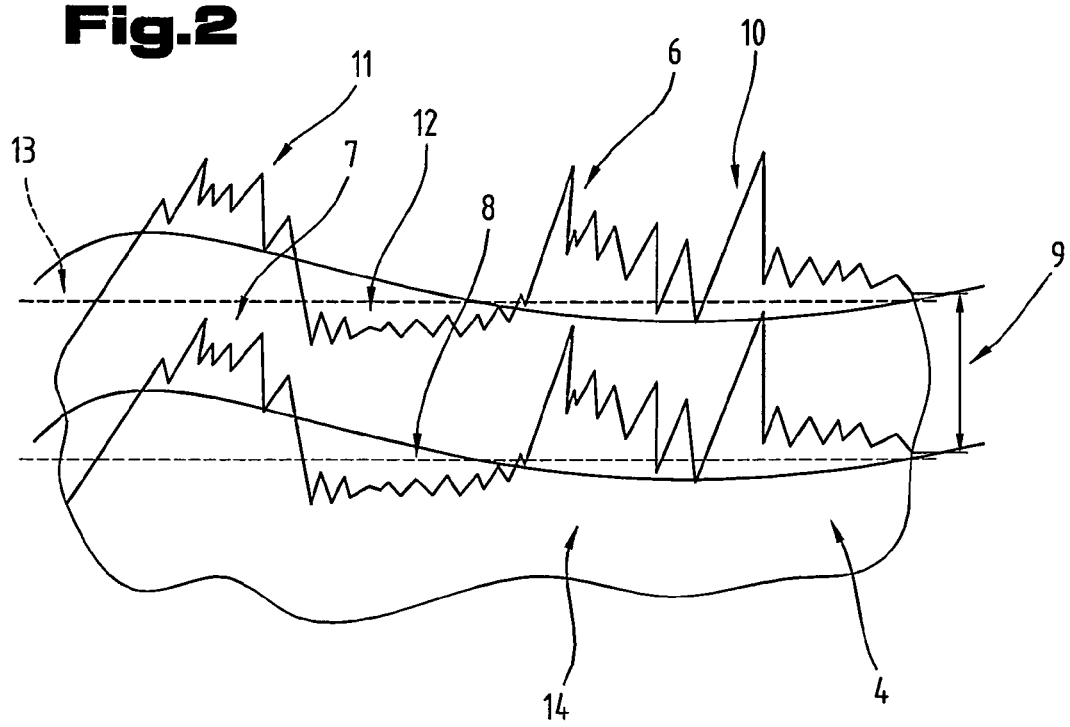
Figure 3:
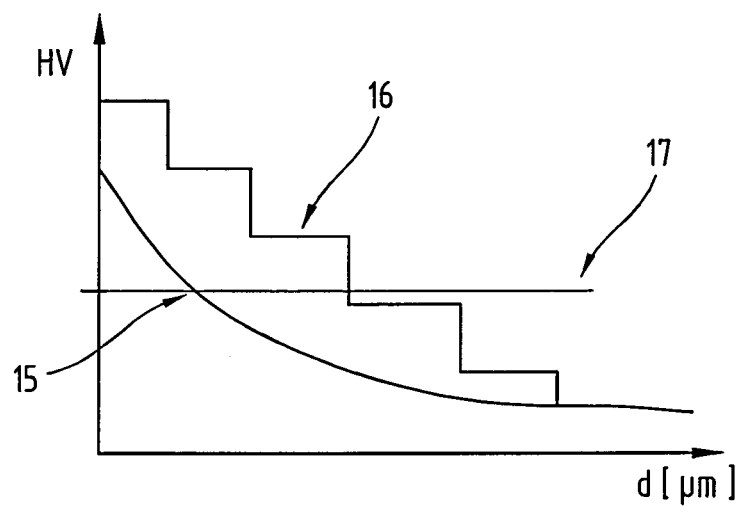
Figure 4:
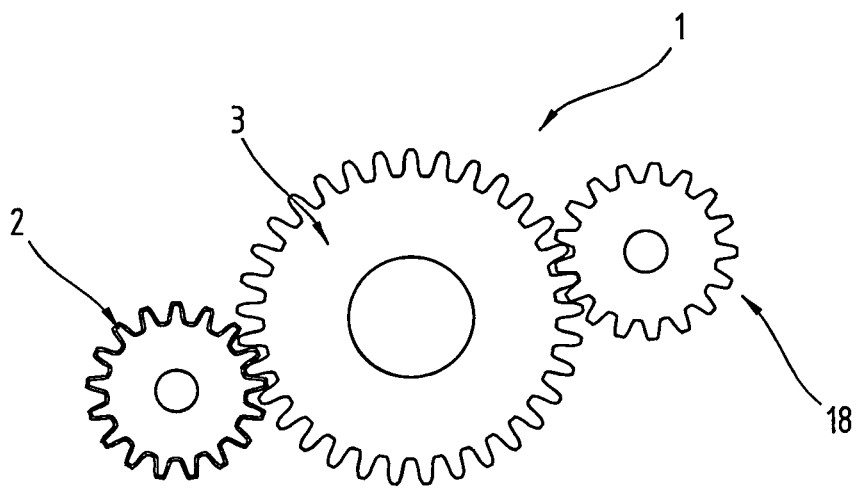
Figure 5:
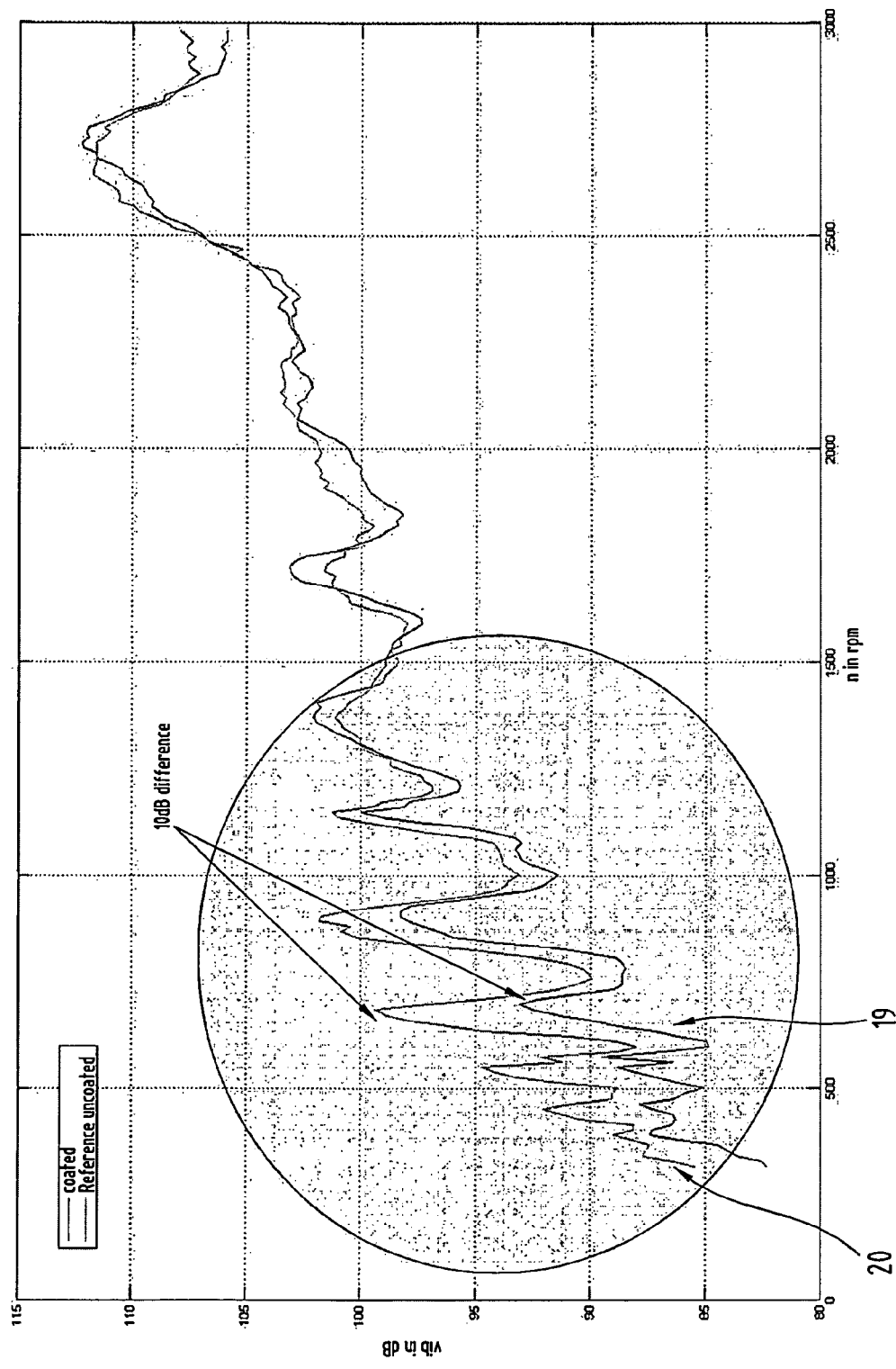
Figure 6:
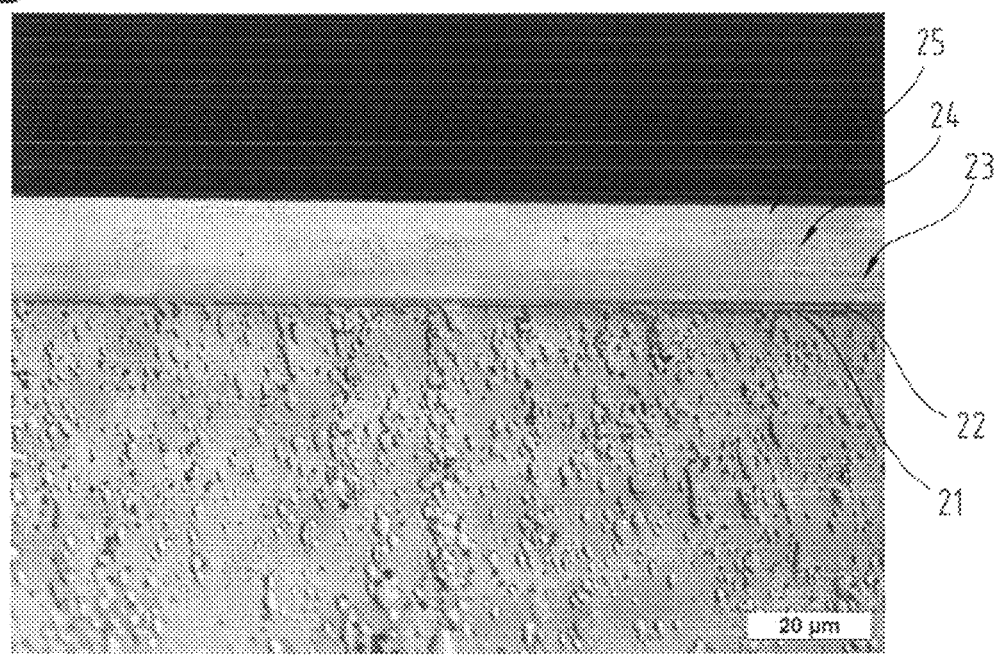
Figure 7:
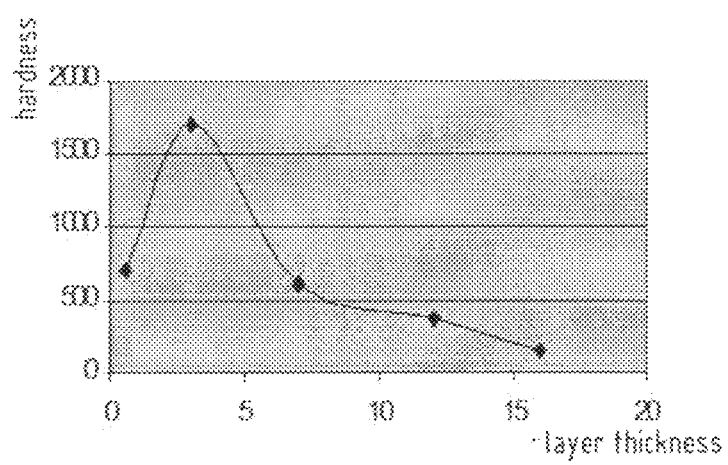
Figure 8:
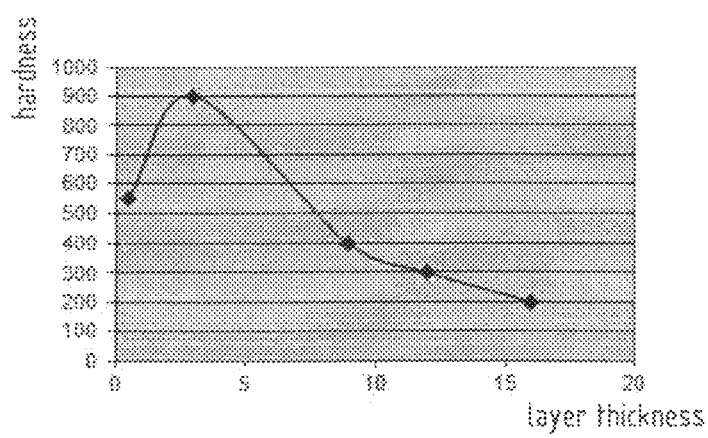

The simplified, schematic drawings illustrate the following:

FIG. 1 an assembly made of two toothed wheels with toothings which are in meshing engagement with each other in lateral view;

FIG. 2 a section of surface profile of a component equipped with an adaptive coating;

FIG. 3 two hardness profiles of the adaptive coating;

FIG. 4 an embodiment of the assembly in lateral view;

FIG. 5 a comparison of the noise characteristics of an coated toothing having with an uncoated toothing;

FIG. 6 a section through a multi-layered adaptive coating;

FIG. 7 a further example of a hardness profile of an adaptive coating;

FIG. 8 another example of a hardness profile of an adaptive coating.

Firstly, it should be pointed out that the same parts described in the different embodiments are denoted by the same reference numbers and the same component names and the disclosures made throughout the description can be transposed in terms of meaning to same parts bearing the same reference numbers or same component names. Further-more, the positions chosen for the purposes of the description, such as top, bottom, side, etc., relate to the drawing specifically being described and can be transposed in terms of meaning to a new position when another position is being described.

All of the details relating to value ranges in the present description are defined such that the latter include any and all part ranges, e.g. a range of 1 to 10 means that all part ranges, starting from the lower limit of 1 to the upper limit 10 are included, i.e. the whole part range beginning with a lower limit of 1 or above and ending at an upper limit of 10 or less, e.g. 1 to 1.7, or 3.2 to 8.1 or 5.5 to 10.

FIG. 1 shows an assembly 1 comprising a component 2 as well as an additional component 3. The component 2 has a toothing 4 in the form of a spur gearing. The component 3 has also a toothing 5 in the form of a spur toothing. Both of the toothings 4, 5 are in meshing engagement with each other when the components are in operation, so that e.g. component 2 is driven by component 3 if component 3 is connected to a driving device not shown. The toothing 4 of the component 2 has an adaptive coating 6 at its end face.

Both of the components 2, 3 are designed to be spur-toothed spur gears. The invention is nevertheless not limited to spur gearings. It is generally possible that the adaptive coating 6 is applied to all known kinds of toothings—optionally having a height crowning and/or a crowning—i.e. for example also to helical gearings, etc. It is furthermore possible that the adaptive coating 6 is applied to both external toothing and internal toothing.

Although the embodiment of the component 2 as a toothed wheel represents the preferred embodiment of the invention, it is generally possible for other components which have a toothing to be equipped with the adaptive coating 6, e.g. gear rods.

At its end face, the toothing 4 is provided with the adaptive coating, preferably across the entire circumference. It is within the scope of the invention also possible that only parts of the end face surface of the toothing 4 are coated, i.e. for example only the tooth flanks or only one of the tooth flanks, such as for example if the toothed wheel is not intended to be operated in both directions of rotation, or only the tooth crests or only the tooth roots, and also mixtures thereof are possible, e.g. coating the tooth flanks and the tooth crests.

In the embodiment shown, the toothing 5 of the additional component 3 has no adaptive coating 6, in particular if this component 3 is the driven component 3 and the component 2 is the component 2 driven by component 3, as it has been described above. In this case, the toothing 5 of the additional component 3 has a higher toothing quality than the toothing 4 of the component 2, so that the component 3 acts as "embossing wheel" for the toothing 4 of the component 2 when the assembly is in operation.

It is nevertheless also possible to also provide its toothing 5 at least partially with the adaptive toothing 6, and it is possible for the composition or the property profile of that coating 6 to be optionally different from that coating 5 of the toothing 4 of component 3, although it also is possible for both of the toothings 4, 5 to have the same adaptive coating 6 having an identical property profile. It is also with this embodiment of advantage if the additional component 3 acts as "forming wheel", for which purpose its toothing 5 may have the higher toothing quality of the two toothings 4, 5 and/or the adaptive coating 6 of the toothing 5 of the additional component 3 has a higher hardness than the adaptive coating of the toothing of component 2 at least in the external region, i.e. that region which contacts the toothing 4 of the component 2.

As already stated above, it is due to the adaptive coating 6 possible to improve the toothing quality of the toothing 4 of component 2 by letting this adaptive coating at least partially deform already in the running-in phase of the meshing toothings 4, 5. These being the case, irregularities of the surface of the toothing 4 of component 2 are at least partially compensated, i.e. leveled, by pressing the toothing 5 of the additional component 3. It should at his point be noted that both components 2, 3, i.e. both toothed wheels, have a fixed axial distance, so that none of the two components 2, 3 moves towards the respective other component 2, 3.

In order to illustrate this effect, FIG. 2 shows a schematic section from the surface geometry of the toothing 4 with an adaptive coating 6 applied thereto. As can be clearly seen, the macrogeometry of the toothing 4 has a roughness profile having elevations 7 and depressions 8. As the entire surface of the toothing 4 is at least approximately coated with an identical layer thickness, this contour of the macrogeometry is for manufacturing reasons at least approximately copied to an outer coating surface 10 of the adaptive coating 6, that gets in contact with the surface of the toothing 5 of the additional component 3, i.e. the opposing toothed wheel, during operation. During operation, with the toothing 5 of the additional component being in meshing engagement with the toothing 4, the thereby transmitted forces brings the material of the profile peaks 11 of the adaptive coating 6 into, in particular adjacent, profile valleys 12, so that the contour of the outer coating surface 10 of the adaptive coating at least approximately levels and thus, an at least approximately flat outer support layer 13 is produced, as illustrated in FIG. 2 by means of dashed line. It is for this reason also advantageous if the toothing 5 of the additional component 3, i.e. the, in particular driven opposing wheel, has a higher toothing quality than the toothing 4, since this additional component 3 acts as "forming wheel". It should nevertheless be mentioned that the flatness of the outer support layer 13 depends on the toothing quality of the toothing 4; it is therefore absolutely possible for this support layer 13 to still have a profiling, which is nevertheless smaller than the original profiling, with an improvement of the toothing quality being achieved in any case, however. It is for example possible to use the adaptive coating 6 during the running-in for turning a quality 10 toothing 2 into a quality 6 toothing 2 at noticeably lower production costs. Once the deformation of the adaptive coating 6 is carried out, the hard subsurface of the component 2, or the harder layers of the adaptive coating 6 situated in this region, as well as the optional hardening of the coating carried out by the plastic deformation, counteract another deformation, as will be explained in more detail below.

Apart from bringing material from the profile peaks 11 into the profile valleys 12, there is also the possibility that the profile peaks 11 are at least partially compressed, provided that the adaptive coating 6 has been produced exhibiting a porosity, with this porosity contributing to achieving a better capacity of the adaptive coating 6 to keep oil at the same time. This being the case, the porosity is preferably between 0.1% and 25%, in particular between 5% and 15%, which means that between 0.1% and 25%, in particular between 5% and 15%, of free pore volume is present in the adaptive coating 6, with particularly at least a large portion, i.e. up to a portion of at least 20% open pores being present—with reference to the absolute pore volume of the adaptive coating 6. It is in this context also of advantage if the pores of the adaptive coating 6 have a maximum diameter of 1 in particular of 0.3 μm. In order to improve the adhesion of the adaptive coating 6 or the strength of the adaptive coating 6 in spite of porosity it is advantageous if the porosity of the outer coating surface 10 decreases in direction towards a component body 14 of the component 2. This being the case it is for example also possible for the porosity to decrease steadily, e.g. linearly or exponentially, or gradually, for example by steps of 20%, i.e. 20% of e.g. 30% of porosity, from a value of 30% at the outer coating surface 10 to a value of 0% at the boundary surface to subjacent component body 14—or an intermediate layer between the adaptive coating 6 and the component body 14. The porosity in the adaptive coating 6 can be generated by depositing the coating 6 at low temperatures, e.g. a temperature of between 40° C. and 200° C., and/or a high pressure, such as a pressure selected from a range having a lower limit of 0.001 mbar and an upper limit of 0.1 mbar, and also temperature gradients and/or pressure gradients can be used. A porosity gradient is e.g. achieved if the temperature drops and/or the pressure rises during deposition or if the bias voltage is lowered during deposition. It is additionally advantageous if the small ration between deposition temperature T and melting temperature TS is set while the layer is being produced, in particular selected from a range of 0.03 to 0.3 (temperature in K) in order for particularly the mobility of the particles at the surface (surface diffusion) and also the volume diffusion ability of the particles to be reduced.

For forming the described support layer 13, the adaptive coating 6 is deposited having a minimum layer thickness 9 of 5 µm. The layer thickness 9 is nevertheless finally determined by the toothing quality of the toothing 4 to be coated. For a quality 7 toothing 2 having a run-out error of between 20 µm and 25 µm at a diameter of 70 mm, a layer thickness 9 of at least 7 µm, in particular a layer thickness 9 selected from a range between 7 µm and 15 µm is used. It is however preferred if the support layer 13 is embodied by at least 0.5 µm, in particular at least 2 µm, above the highest peak 7 of the surface profile of the toothing 4. For this reason, layer thicknesses 9 are preferred, which are selected from a range having a lower limit of 12 µm and an upper limit of 20 µm, in particular from a range having a lower limit of 15 µm and an upper limit of 50 µm.

It is preferred if the adaptive coating 6 is at least partially metallic, i.e. that at least individual elements of the preferably used multi-element system are made of metals or metal alloys. It is principally also possible to use polymer materials for the adaptive coatings 6.

At least one element of the multi-element system is selected from a group including transition metals, transition metal nitrides, transition metal carbides, transition metal oxides, as well as mixtures thereof. The portion of this element with respect to the adaptive coating 6 is between 5% by weight and 60% by weight, in particular between 10% by weight and 40% by weight. It is preferred if this element is present to be particulate, having a maximum size of particles of 3 µm, in particular having a particle size of between 0.5 µm and 1.5 µm. It is in this case of advantage if the nitrides, carbides or oxides are only or mainly—i.e. to an extent of at least 95% relative to the total portion of those elements—arranged in the transition section between the coating 6 to the toothed wheel or the component 2.

A further element of the multi-element system is preferably selected from a group including Sn, Mg, Al, In, Bi, Si, Ni, Ag, Cr and Fe, with their percentage in the adaptive coating 6 being between 20% by weight and 80% by weight, in particular between 35% by weight and 55% by weight. The maximum particle size of this further element is 4 µm, this element has in particular a particle size of between 1 µm and 2 µm.

According to a first preferred embodiment, the adaptive coating 6 contains the elements Ag and Cr or CrN, with the content of Ag decreasing from the outer coating surface in the direction towards the component body. This being the case, the portion of Ag can be between 100% by weight and 0% by weight. The rest is made of Cr or CrN.

According to another preferred embodiment, the adaptive coating 6 includes the elements Sn and Cr, with the content of Sn decreasing from the outer coating surface in the direction towards the component body. This being the case, the portion of Sn can be between 100% by weight and 0% by weight. The rest is made of Cr.

An adaptive coating 6 containing the elements Ag, Sn and Ti has also turned out to be advantageous, with the content of Ag decreasing from the outer coating surface in the direction towards the component body. This being the case, the portion of Ag can be between 100% by weight and 0% by weight. The rest is made of Ti and Al.

Also adaptive coatings 6 are preferred which are formed from a copper bronze or an aluminum bronze, optionally having a portion of Cr. The portion of Cu in the copper bronze may be between 98% by weight and 60% by weight, that of Sn between 0% by weight and 12% by weight, or the portion of Al in the aluminum bronze can be between 0.01% by weight and 20% by weight, that of Sn can be between 0% by weight and 12% by weight. Provided that Cr is contained, its portion is between 0.1% by weight and 80% by weight.

Preferred compositions of the adaptive coating 6 can be seen in the following table 1. Any details relating to the composition are given in % by weight. The values are averages as seen across the entire layer thickness if individual elements form concentration gradients in the coating 6. The FIGS. 6 and 7 each show an example with such concentration gradients, and the last column of the table 1 indicates the respective layer depth where the respective concentration was measured relative to the total layer depth.

TABLE 1

| Composition of the adaptive coating 6 | | | | | | | | |
|---|---|---|---|---|---|---|---|---|
| Example No | Ag | Cr | CrN | Sn | Ti | Al | Cu | Layer depth [%] |
| 1 | 58 | 40 | 2 | | | | | |
| 2 | 62 | 30 | 2 | 6 | | | | |
| 3 | | 40 | 2 | | | | 58 | |
| 4 | | 20 | 2 | | | | 78 | |
| 5 | | 10 | 2 | | 4 | 8 | 76 | |
| 6 | | | 100 | | | | | 5 |
| 6 | 47.5 | 50 | | | | | 2.5 | 20 |
| 6 | 85.5 | 10 | | | | | 4.5 | 30 |
| 7 | 10 | 80 | | 9.5 | 1 | | 0.5 | 5 |
| 7 | 66.5 | 30 | | | | | 3.5 | 20 |
| 7 | 90 | 5 | | | | | 5 | 30 |

In the preferred embodiment of the adaptive coating 6, the latter has a hardness gradient having an increasing hardness starting from the outer coating surface 10 in the direction towards the component body 14. This being the case, the adaptive coating 6 can have a hardness at the outer coating surface 10, which is selected from a range having a lower limit of HV 40 and an upper limit of HV 500, in particular from a range having a lower limit of HV 200 and an upper limit of HV 300. At the second surface, opposite the outer coating surface 10 and pointing in a direction towards the component body 14, the adaptive coating 6 has a hardness, which is selected from a range having a lower limit of HV 500 and an upper limit of HV 2,000, in particular from a range having a lower limit of HV 800 and an upper limit of HV 1,200.

To illustrate this, FIG. 3 schematically shows two profiles 15, 16. The axis of abscissae here shows the layer thickness 9, originating from the surface of the toothing 2 in the direction towards the outer coating surface, and the ordinate shows the Martens hardness translated into HV, measured by means of a Fischerscope®. H100 (hardness measurement in accordance with DIN EN ISO 14577, Vickers diamond pyramid, test load 10 mN, six individual measurements per hardness value). The horizontal line 16 marks the hardness of steel.

The term plastic hardness refers to the universal hardness without taking into consideration the elastic deformation component.

The profile 15 shows the preferred embodiment of the invention. The hardness does here not decrease gradually, as in profile 16, but continuously, with the profile 15 running linearly or preferably following an exponential function.

Table 2 shows examples for hardness profiles, measured at different layer depths of the adaptive coating 6, originating from the surface of the toothing 4, or optionally an intermediate layer between this surface and the adaptive coating 6, and the numbers of the examples refer to table 1. The first value per cell refers to the hardness according to HV corresponding to the above explanations, the second value following the dash is the respective layer thickness of the individual layer where the measurement has been carried out. The total layer thickness of the adaptive coating 6 results from the respective sum of the values following the dash inside a cell. The coating 6 according to example 1 has e.g. a total layer thickness of 20 µm. For better clarity, the hardness values are rounded up or down to the nearest 50 value.

TABLE 2

Hardness profiles

| Example No | Layer thickness in µm | | | | |
|---|---|---|---|---|---|
| | S1 | S2 | S3 | S4 | S5 |
| 1 | 1200/1 | 800/8 | 550/5 | 400/3 | 300/3 |
| 2 | 1500/2 | 800/7 | 300/7 | | |
| 3 | 2000/1 | 1000/2 | 700/8 | 400/4 | 200/3 |
| 4 | 1500/1 | 600/10 | 300/4 | | |
| 5 | 1500/2 | 800/4 | 500/4 | 200/2 | 100/2 |
| 6 | 1000/3 | 600/4 | 300/3 | 100/2 | 60/2 |

In a preferred embodiment, the outer coating surface 10 consists exclusively of the respective softer component of the multi-element system, such as e.g. Ag or Sn. It is optionally possible that a maximum portion of 30% by weight of the respective harder element, such as e.g. Cr, CrN, or Ti, in order to achieve an adaption of hardness.

The deposition of the adaptive coating 6 onto the toothing 4 of component 2 can be performed by very different methods, such as e.g. in a galvanic way by several baths in different materials such as Ni and Sn, Cu or also Ag and Sn, Ag and Cu, etc. NiP layers having different contents of phosphor and/or dispersive incorporations (Teflon, hexagonal boron nitride, silicon carbide, etc.), by applying PVD methods, such as sputtering, by injecting, etc. different targets in circular arrangement of two, four, six, eight, ten, etc. targets having the desired materials, such as target 1 Cr, target 2 Ag, target 3 Cr, target 4 Sn, sputtering in in-line systems as conveyor system with exactly coordinated targets at the individual stations. It is also possible to combine different PVD methods, such as electron beam evaporation from different sources such as chromium and silver. Also in terms of the injection methods it is possible to deposit different materials at the same time of one after the other.

A hardness gradient can for example be formed by varying the composition, the structure, the grain size and/or the porosity, or by adding nitrides.

In a simple embodiment, it is possible for the hardness gradient to be made by a multi-layered design of the adaptive coating 6 having several different sub-layers, and the sub-layers can have different compositions.

In order to achieve the hardness gradient, the composition of the adaptive coating 6 can vary across the layer thickness 9 in such a way, that a minority element on the outer coating surface 10 becomes the majority element of the other surface facing the component body 14, and that an additional element of the multi-element system has the exactly reverse profile, i.e. the majority element turns into the minority element. In other words, there is the possibility that the element forming the matrix is substituted by another element on the other surface of the adaptive coating 6, so that the matrix changes to another matrix across the layer thickness 9, e.g. from CrAg30 to AgCr20. Due to the rotation velocity and/or the temperature at the substrate, it is possible to largely avoid a continuous multi-layer structure.

For the above reasons, the adaptive coating 6 is free from abrasive particles.

In order for the adhesive strength of the adaptive coating 6 at the toothed system 4 of the component 2 to be increased, it is possible to arrange an bonding layer between the latter and the adaptive coating 6, such as of Cr, Ti, CrN, TiN. It nevertheless also possible to achieve an improved adhesion strength by forming diffusion bondings at the boundary surface between the component body 14 and the adaptive coating, by e.g. subjecting the component to a heat treatment after the coating, e.g. 24 hours at a temperature of 200° C. It is preferred if the component 2 and/or the adaptive coating contains Chrome and/or titanium for this purpose.

For the sake of completeness, FIG. 4 shows an embodiment of the assembly 1. Apart from the component 2 and the additional component 3 it has a third component 18, with the additional component 3 having the highest quality of the toothed system of all three components 2, 3, 18. The invention can for example be applied to the field of camshaft toothed wheels or differential gear-shaft units.

FIG. 5 shows the noise characteristics as a profile of the sum level (axis of abscissae, given in db) of a toothed wheel having a coated toothing (profile 19) compared to an uncoated toothed wheel (profile 20) in a speed range between 0 and 3000 rpm (axis of abscissae). FIGS. 6 and 7 (layer thickness in µm) show a micrograph of the adaptive coating 6 or the hardness profile corresponding thereto. The hardness values are summarized in following table 3.

A toothed wheel of steel was chosen as the opposing wheel for the measurement of the noise characteristics. FIG. 5 clearly shows that the toothed wheel provided with the coating according to the invention has, in particular in the lower speed range, a lower noise development than the toothed wheel.

TABLE 3

Exemplary layer system

| Layer | Reference number in FIG. 6 | Thickness µm | Hardness HV | Material | | Material (% by weight) | |
|---|---|---|---|---|---|---|---|
| | | | | 1 | 2 | 1 | 2 |
| 1 | 21 | 0.5 | 700 | Cr | | 100 | |
| 2 | 22 | 3 | 1700 | CrN | | 100 | |
| 3 | 23 | 7 | 620 | Cr | Ag | 60 | 40 |
| 4 | 24 | 12 | 370 | Cr | Ag | 30 | 70 |
| 5 | 25 | 16 | 140 | Cr | Ag | 5 | 95 |

The adaptive coating 6 was applied to a toothed wheel of stell as a carrier. FIG. 6 clearly shows the individual layers. This coating was produced by way of the following method parameters (four targets, each displaced by 90°, target 1 Cr, target 2 Ag, target 3 Cr, target 4 Ag):

| Layer | Pressure mbar | Chromium power KW | Silver power KW | Gas inlet Ar sccm | N2 sccm | Rotation speed SH Parts rpm | rpm |
|---|---|---|---|---|---|---|---|
| 1 | 0.001 | 5 | 0 | 70 | 0 | 3 | 0.5 |
| 2 | 0.001 | 5 | 0 | 70 | 20 | 3 | 0.5 |
| 3 | 0.001 | 5 | 2 | 70 | 0 | 3 | 0.5 |
| 4 | 0.001 | 5 | 8 | 70 | 0 | 3 | 0.5 |
| 5 | 0.001 | 3 | 10 | 70 | 0 | 3 | 0.5 |

Substrate holder with dual or triple rotation as a function of the size of the parts, rotation from 3 rpm up to 20 rpm. Arrangement of targets in unbalanced mode.

Coating process:

coating both of the chromium targets in order to produce a Cr connecting layer of 0.5 μm continuous transition to CrN within 50 nm by nitrogen inlet under OEM checking, then constant deposition 2.5 μm CrN, continuous reduction of nitrogen to 0 sccm and starting the deposition at the silver targets, 100 nm, depositing a CrAg40 layer of approx. 4 μm by continuously constant deposition at all four targets (2 chromium, 2 silver) with simultaneously rotating substrate holder.

depositing an AGCr30 layer of approx. 5 μm by continuously constant deposition at all four targets at an increased Ag deposition rate by larger power density at simultaneous rotation of the substrate holder.

depositing an AgCr5 layer of 4 μm by continuously constant deposition at all four targets at increased Ag deposition rate and reduced power density at the chromium targets at simultaneous rotation of the substrate holder.

It is optionally possible to deposit another AgCr1 layer of 2 to 5 μm afterwards by continuously constant deposition at all 4 targets at an increased Ag deposition rate and reduced power density at the chromium targets at simultaneous rotation of the substrate holder.

FIG. 8 shows another exemplary embodiment of a hardness profile within the layer system of the adaptive coating 6 (layer thickness in μm). The hardness values are summarized in table 4. This coating has been produced by using the following process parameters:

| Layer | Pressure mbar | 1.4301 Power KW | Silver Power KW | Gas inlet Ar sccm | N2 sccm | Rotation speed SH Teile rpm | rpm |
|---|---|---|---|---|---|---|---|
| 1 | 0.001 | 10 | 0 | 70 | 0 | 3 | 0.5 |
| 2 | 0.001 | 10 | 0.9 | 70 | 15 | 3 | 0.5 |
| 3 | 0.001 | 10 | 5 | 70 | 8 | 3 | 0.5 |
| 4 | 0.008 | 9 | 9 | 70 | 0 | 3 | 0.5 |
| 5 | 0.008 | 3 | 12 | 70 | 0 | 3 | 0.5 |

TABLE 4

Exemplary layer system

| Layer | Thickness μm | Hardness HV | Material 1 | 2 | 3 | 4 | Material (% by weight) 1 | 2 | 3 | 4 |
|---|---|---|---|---|---|---|---|---|---|---|
| 1 | 0.5 | 550 | Fe | Cr | Ni | Ag | 74 | 18 | 9 | |
| 2 | 3 | 900 | Fe | CrN | Ni | Ag | 67 | 18 | 8 | 7 |
| 3 | 9 | 400 | Fe | CrN | Ni | Ag | 37 | 12 | 4 | 47 |
| 4 | 12 | 300 | Fe | Cr | Ni | Ag | 25 | 6 | 3 | 66 |
| 5 | 16 | 200 | Fe | Cr | Ni | Ag | 7 | 2 | 1 | 90 |

As already stated, it is possible for both of the toothings 4, 5 of the components 2, 3 or of all of the components 2, 3, 18 of an assembly 1 to be coated, and also different compositions of coatings of the adaptive coating 6 can be used for the components 2, 3, 18. The toothing 4 of component 2 can e.g. be coated with Cr/Ag and the toothing 5 of component 3 can be coated with Cr/Cu. This being the case, it generally applies that a hard coating 6 of component 2 and a softer coating 6—as compared to the latter—of component 3 can be combined, at least the two outer layers, which are in contact with each other, having this relative hardness, and it is possible for the layer composition underneath, to the extent the adaptive coating 6 is designed to have layers, to be at least similar.

The embodiments illustrated as examples represent possible variants of the component 2 and the assembly 1, and it should be pointed out at this stage that the invention is not specifically limited to the variants specifically illustrated, and instead the individual variants may be used in different combinations with one another and these possible variations lie within the reach of the person skilled in this technical field given the disclosed technical teaching.

Particularly, the individual features illustrated in the embodiments shown in the FIGS. 1-8 may be construed as independent solutions proposed by the invention in their own right.

For the sake of good order, finally, it should be pointed out that, in order to provide a clearer understanding of the structure of the component 2 and the assembly 1, it and its constituent parts are illustrated to a certain extent out of scale and/or on an enlarged scale and/or on a reduced scale.

LIST OF REFERENCE NUMERALS

1 Assembly
2 Component
3 Component
4 Toothing
5 Toothing
6 Coating
7 Elevation
8 Depression
9 Layer thickness
Coating surface
11 Profile peak
12 Profile valley
13 Support layer
14 Component body
15 Profile
16 Profile
17 Line
18 Component
19 Profile
20 Profile 21 Layer
22 Layer
23 Layer
24 Layer
25 Layer

The invention claimed is:

1. Component comprising a component body which has a toothing, wherein an adaptive coating having a minimum thickness of 5 µm is applied to at least a portion of the toothing, wherein a surface of the toothing has a roughness profile with peaks and valleys forming a macrogeometry, wherein an entirety of the coated portion of the toothing is at least approximately coated with an identical layer thickness with the adaptive coating having an outer surface coating, so that the roughness profile of the macrogeometry of the surface of the toothing is copied to the outer coating surface of the adaptive coating, wherein the adaptive coating is plastically deformable to bring material of the peaks into the valleys between the peaks and produce a support layer, and wherein the adaptive coating consists of one of the following multicomponent systems:

Ag and Cr with the content of Ag decreasing from an outer coating surface in the direction towards the component body or Ag and CrN with the content of Ag decreasing from an outer coating surface in the direction towards the component body or Sn and Cr with the content of Sn decreasing from an outer coating surface in the direction towards the component body or Ag and Ti with the content of Ag decreasing from an outer coating surface in the direction towards the component body or Ag and Ti and Sn with the content of Ag decreasing from an outer coating surface in the direction towards the component body or Cu, CuSn and Cr with the CuSn content decreasing from an outer coating surface in the direction towards the component body or a copper bronze or an aluminum bronze wherein the copper bronze or the aluminum bronze contains at least one of the elements chromium nitride, Fe, and Ag.

2. Component according to claim 1, wherein the adaptive coating has a hardness gradient that has an increasing hardness from an outer coating surface in the direction towards the component body.

3. Component according to claim 1, wherein the adaptive coating is made of several different sub-layers.

4. Component according to claim 1, wherein the adaptive coating is at least approximately or completely free from abrasive particles.

5. Component according to claim 1, wherein a bonding layer is disposed between the adaptive coating and the component body.

6. Component according to claim 1, wherein the adaptive coating has a porosity of between 0.1% and 15%.

7. Component according to claim 6, wherein the pores in the adaptive coating have a maximum diameter of 3 µm.

8. Component according to claim 6, wherein the porosity decreases from the outer coating surface in the direction towards the component body.

* * * * *